(12) United States Patent
Claussen

(10) Patent No.: US 9,259,755 B2
(45) Date of Patent: Feb. 16, 2016

(54) SPRAY HOOD

(75) Inventor: Steven W. Claussen, Glenwood, MN (US)

(73) Assignee: WILLMAR FABRICATION, LLC, Willmar, MN (US)

( * ) Notice: Subject to any disclaimer, the term of this patent is extended or adjusted under 35 U.S.C. 154(b) by 816 days.

(21) Appl. No.: 13/533,168

(22) Filed: Jun. 26, 2012

(65) Prior Publication Data

US 2013/0001320 A1      Jan. 3, 2013

Related U.S. Application Data

(60) Provisional application No. 61/503,748, filed on Jul. 1, 2011.

(51) Int. Cl.
*E01C 23/22* (2006.01)
*B05B 15/04* (2006.01)
*A01M 7/00* (2006.01)

(52) U.S. Cl.
CPC .......... *B05B 15/0437* (2013.01); *A01M 7/0064* (2013.01)

(58) Field of Classification Search
USPC ................................................. 239/150, 172
See application file for complete search history.

(56) References Cited

U.S. PATENT DOCUMENTS

| | | |
|---|---|---|
| 556,447 A | 3/1896 | Van Deusen |
| 1,527,669 A | 2/1925 | Camp |
| 1,669,435 A | 5/1928 | Wheeler |
| 2,641,505 A | 6/1953 | Valois |
| 4,274,589 A * | 6/1981 | Jones ............................ 239/167 |
| 4,379,522 A | 4/1983 | Elliott et al. |
| 4,441,655 A | 4/1984 | Blumhardt |
| 4,456,180 A | 6/1984 | Lury |
| 4,634,051 A | 1/1987 | Dudley |
| 4,711,398 A | 12/1987 | Ganderton et al. |
| 4,736,888 A | 4/1988 | Fasnacht |
| 4,947,581 A | 8/1990 | Claussen et al. |
| 5,069,090 A | 12/1991 | Clark |
| 5,155,933 A | 10/1992 | Claussen et al. |
| 5,156,338 A | 10/1992 | Borland et al. |
| 5,248,090 A * | 9/1993 | Williamson .................. 239/168 |
| 5,371,969 A * | 12/1994 | Claussen et al. ................. 47/1.7 |
| D356,629 S | 3/1995 | Claussen et al. |
| 5,398,874 A * | 3/1995 | Dailey .......................... 239/288 |
| 5,520,335 A | 5/1996 | Claussen et al. |

(Continued)

FOREIGN PATENT DOCUMENTS

| | | |
|---|---|---|
| CA | 689054 | 6/1964 |
| FR | 1314571 | 1/1963 |

OTHER PUBLICATIONS

U.S. Appl. No. 29/396,580, filed Jul. 1, 2011, Claussen.

(Continued)

*Primary Examiner* — Len Tran
*Assistant Examiner* — Adam J Rogers
(74) *Attorney, Agent, or Firm* — Mueting Raasch & Gebhardt, P.A.

(57) ABSTRACT

Spray hood assemblies may be adapted to be moved over undesired foliage so as to temporarily enclose them when liquids (e.g., agricultural chemicals such as herbicide) are sprayed. The spray hood assemblies may assist in ensuring that a high percentage of the sprayed liquids are deposited where they are intended to be sprayed rather than being blown away or onto adjacent desired plants.

22 Claims, 13 Drawing Sheets

(56) References Cited

U.S. PATENT DOCUMENTS

| | | |
|---|---|---|
| 5,526,605 A | 6/1996 | O'Dougherty |
| D372,298 S | 7/1996 | Claussen et al. |
| 5,833,144 A * | 11/1998 | Kinter ........................... 239/462 |
| 6,047,901 A | 4/2000 | Pederson et al. |
| 6,334,578 B1 * | 1/2002 | House ........................ 239/288.5 |
| 6,375,089 B1 * | 4/2002 | Taylor et al. ..................... 239/1 |
| 6,705,546 B2 | 3/2004 | Bosch |
| 8,382,046 B2 * | 2/2013 | Holland et al. ................. 248/73 |

OTHER PUBLICATIONS

"94-95" catalog illustrating "Hose Shank Nozzle Bodies and Vari-Spacing Clamps," p. 61; Custom Ag Products, Inc., Benson, MN; 1 page.

* cited by examiner

Fig. 12
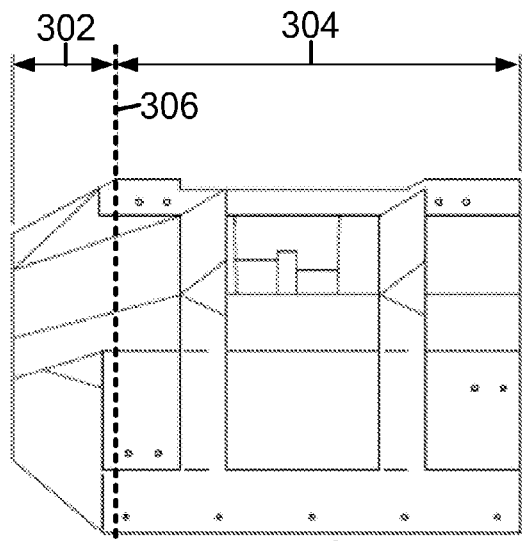
A
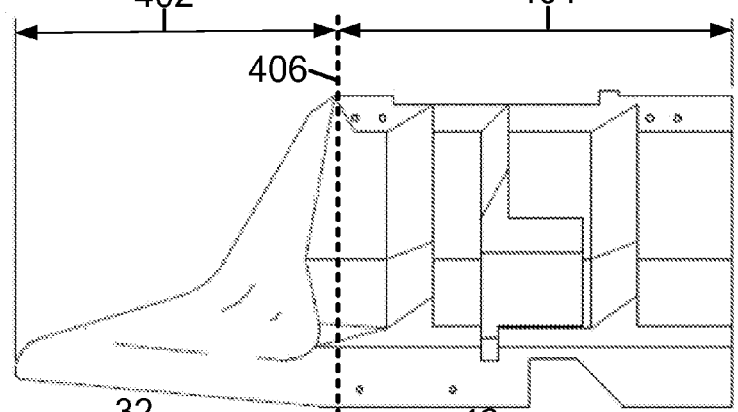
B
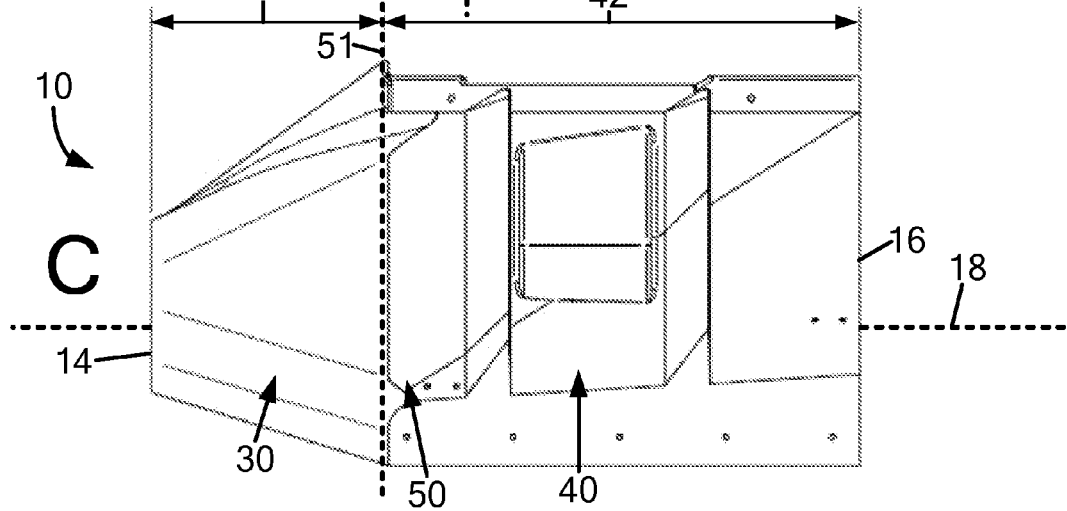
C

SPRAY HOOD

CROSS-REFERENCE TO RELATED APPLICATION

This application claims the benefit of U.S. Provisional Application Ser. No. 61/503,748, filed Jul. 1, 2011, which is incorporated herein by reference in its entirety.

BACKGROUND

The present disclosure relates to spray hood assemblies adapted to be moved over undesired foliage so as to temporarily enclose them when liquids (e.g., agricultural chemicals such as herbicide) are sprayed. The spray hood assemblies may assist in ensuring that a high percentage of the sprayed liquids are deposited where they are intended to be sprayed rather than being blown away or onto adjacent desired plants.

Known are several spray hood, or shield, assemblies adapted to be moved over plants being grown in rows in a field so as to temporarily enclose them when liquids or agricultural chemicals are sprayed thereby helping to ensure that a high percentage of the sprayed liquids are deposited on or around undesired foliage intended to be sprayed rather than being blown away or onto adjacent plants. Such spray hoods have been sold by Ryan Manufacturing, Box 239, Newark, Ill. 60551 and Hiniker Company, P.O. Box 3407, Mankato, Minn. 56001, and are described in U.S. Pat. No. 4,947,581 and U.S. Pat. No. 5,155,933. Further, additional spray hoods, or shields, have been described in U.S. Pat. No. 5,155,933, U.S. Pat. No. 5,371,969, and U.S. Pat. No. 5,526,605.

SUMMARY

The exemplary spray hood, or shield, assemblies described herein may be adapted to be connected to a support frame moved over desired foliage, or plants, being grown in spaced rows from a ground surface (e.g., earthen surface) and to be moved along the ground surface between the rows of desired foliage while liquids such as herbicides (e.g., the herbicide commercially available as "Roundup" from Monsanto) not intended for contact with desired foliage in the rows may be sprayed between the rows onto undesired foliage (e.g., weeds) located between the rows of desired foliage over which the spray hood assembly passes.

One exemplary spray hood assembly may be operable to spray liquid onto undesired foliage between rows of desired foliage using at least one spray nozzle. The at least one spray nozzle may extend along an axis and may include an upper flange and a lower flange. Each flange may extend perpendicularly from the axis around the at least one spray nozzle. The exemplary spray hood assembly may include a spray hood and at least one spray nozzle assembly.

The spray hood may extend from a front end to a rear end and may define an outer surface and an inner surface. The inner surface may define a channel from the front end to the rear end. The spray hood may further define at least one spray nozzle aperture configured to receive the at least one spray nozzle. In at least one embodiment, the least one spray nozzle aperture defines an opening larger than each of the upper and lower flanges of the at least one spray nozzle.

The at least one spray nozzle assembly may be configured to retain the at least one spray nozzle within the at least one spray nozzle aperture of the spray hood. The at least one spray nozzle assembly may include a first retention plate and a second retention plate. The first retention plate may be coupled to the spray hood and may define a receiving opening configured to receive a spray nozzle therein (e.g., a slot extending from an edge surface into an interior portion). The first retention plate may further define a top side and a bottom side. The second retention plate may be coupled to the spray hood and may define a receiving opening configured to receive a spray nozzle therein (e.g., a slot extending from an edge surface into an interior portion). The second retention plate may further define a top side and a bottom side.

The at least one spray nozzle may be retained within the receiving opening of each of the first retention plate and the second retention plate such the top side of the first retention plate is adjacent the upper flange of the at least one spray nozzle and the bottom side of the first retention plate is adjacent the top side of the second retention plate and such that the bottom side of the second retention plate is adjacent the lower flange of the at least one spray nozzle. In at least one embodiment, the receiving opening of the first retention plate and the receiving opening of the second retention plate may be located opposite one another when the at least one spray nozzle is retained within the receiving opening of each of the first retention plate and the second retention plate.

In one or more exemplary spray hood assemblies described herein, the spray hood may define a first fastener aperture and a second fastener aperture. Each of the first and the second fastener aperture may be located proximate the at least one spray nozzle aperture, and the at least one spray nozzle assembly may further include a first fastener configured to couple the first retention plate to the spray hood using the first fastener aperture, and second fastener configured to couple the second retention plate to the spray hood using the second fastener aperture. Further, the spray hood may further include a threaded nut molded into the spray hood for each of the first and the second fastener apertures—the threaded nut being configured to receive a threaded fastener.

In one or more exemplary spray hood assemblies described herein, the spray hood may further include a raised area proximate the at least one spray nozzle aperture configured to contact the bottom side of the first retention plate. Further, the second retention plate may define an edge perpendicular to each of the top and the bottom sides and proximate the receiving opening, and the edge of the second retention plate may contact a side surface of the raised area of the spray hood.

In one or more exemplary spray hood assemblies described herein, the receiving opening of each of the first and the second retention plates may define a first retaining surface, a second retaining surface, and a third retaining surface. The first, second, and third retaining surfaces may be configured to receive three of four sides of a square portion of the at least one spray nozzle located between the first flange and the second flange to restrict rotational movement of the at least one spray nozzle about the axis.

Another exemplary spray hood assembly may be operable to traverse a ground surface and to spray liquid using spray nozzles onto undesired foliage between rows of desired foliage located on the ground surface. The spray hood assembly may include a spray hood and a closure sheet.

The spray hood of the exemplary spray hood assembly may extend from a front end to a rear end along an axis and may define an outer surface and an inner surface. The inner surface may define a channel extending from the front end to the rear end. The channel may define an open end located at the front end of the spray hood.

The spray hood may include a tapered front portion and a rear portion. The tapered front portion may extend from the front end to a transition region (e.g., the transition region may be a transition plane perpendicular to the axis) and may define a tapered front portion length parallel to the axis. In at least one embodiment, the spray hood may converge from the transition region to the front end such that the channel proximate the front end is smaller than the channel proximate the transition region. The rear portion may extend from the rear end to the transition region and may define a rear portion length parallel to the axis. In at least one embodiment, the tapered front portion length may be greater than 30% of the rear portion length. In at least one embodiment, the tapered front portion length may be greater than 40% of the rear portion length.

The closure sheet may be coupled to the spray hood proximate the open end of the channel. The closure sheet may be configured to retain liquid when sprayed by spray nozzles within the channel and to allow the passage of undesired foliage into the channel of the spray hood when operating. Further, the channel of the spray hood may further define a rear open end located at the rear end of the spray hood. The spray hood assembly may further include a rear closure sheet coupled to the spray hood proximate the rear open end of the channel, and the rear closure sheet may be configured to retain liquid sprayed by spray nozzles within the channel and to allow the passage of undesired foliage out of the channel of the spray hood.

In one or more exemplary spray hood assemblies described herein, the spray hood assembly may further include at least one gathering rod extending from the spray hood proximate the transition region to the front end. The at least one gathering rod may be configured to direct undesired foliage into the channel. Further, the at least one gathering rod may define a proximal portion and a distal portion. The proximal portion may be coupled to the spray hood proximate the transition region and may extend beyond the front end parallel to the axis. The distal portion may be coupled to the spray hood proximate the front end and coupled to the proximal portion.

In one or more exemplary spray hood assemblies described herein, the spray hood assembly may further include at least one knock-down bar located within the channel extending perpendicular to the axis. The at least one knock-down bar may be configured to deflect undesired foliage located within the channel downwardly towards the ground surface.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIGS. 12A-B are right side views of prior art spray hoods.

FIG. 12C is a right side view of an exemplary spray hood of the spray hood assembly of FIG. 1.

DETAILED DESCRIPTION OF EXEMPLARY EMBODIMENTS

Figure 1:
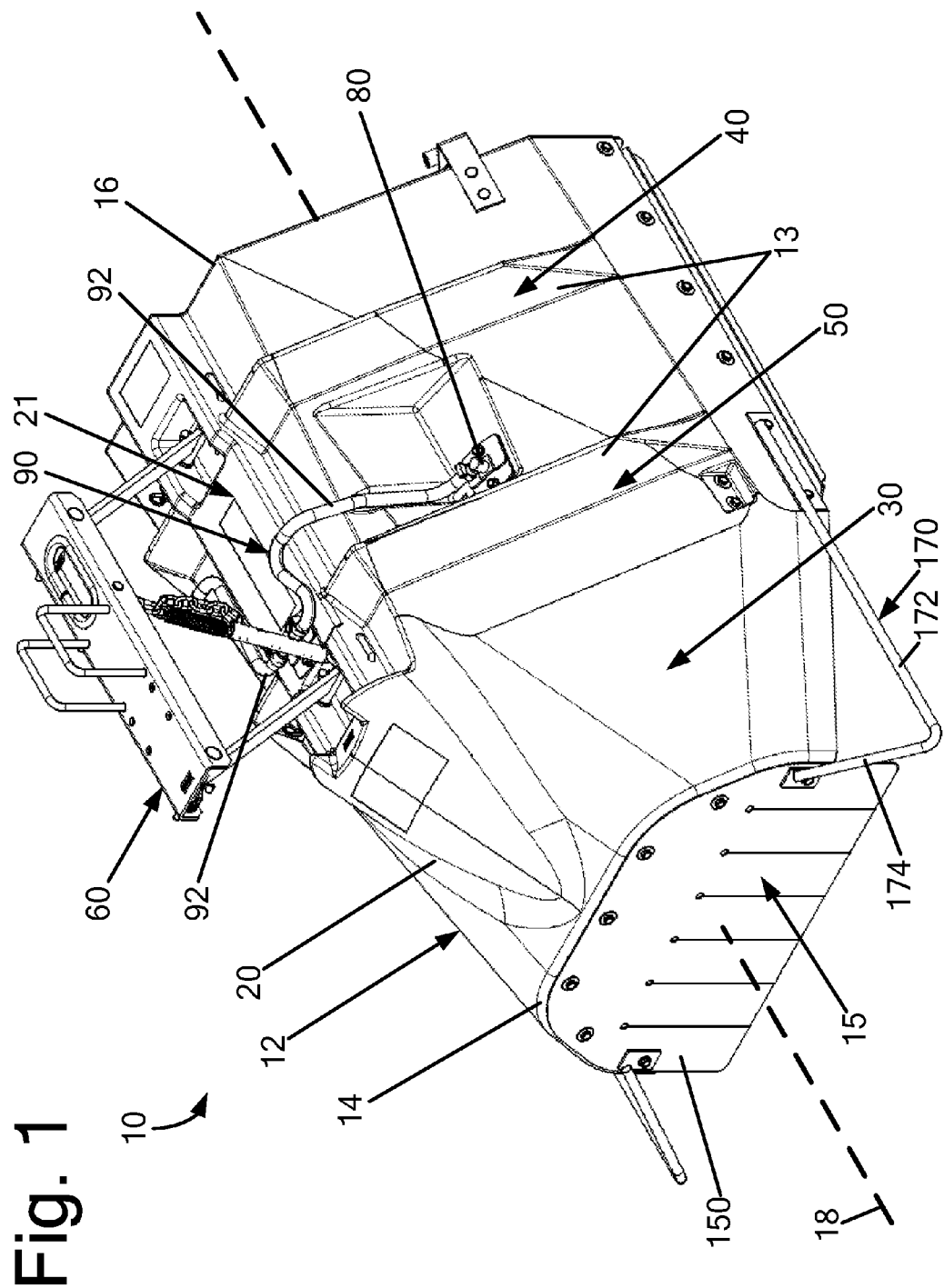
FIG. 1 is a perspective view of an exemplary spray hood assembly.
Figure 2:
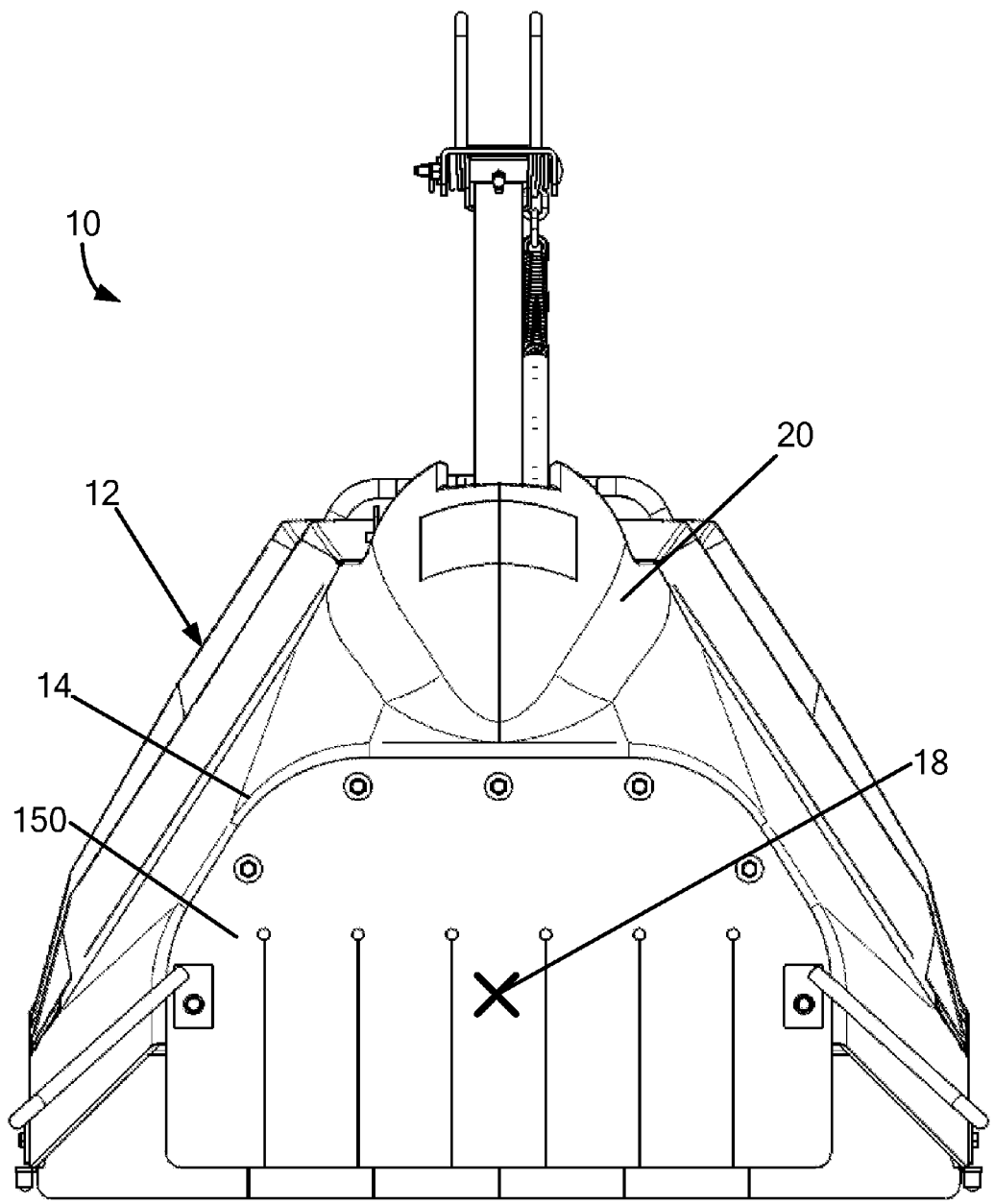
FIG. 2 is a front view of the spray hood assembly of FIG. 1.
Figure 3:
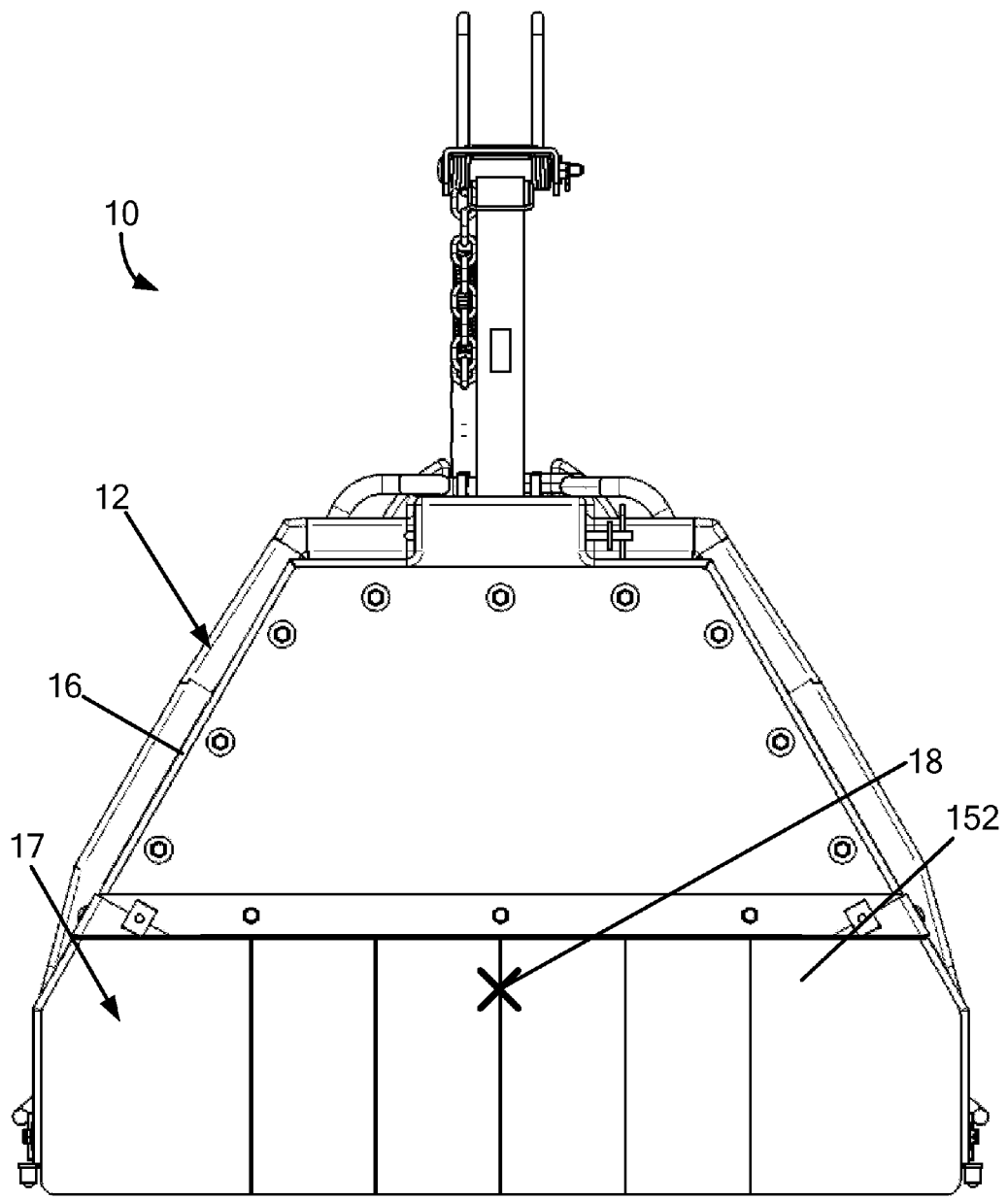
FIG. 3 is a rear view of the spray hood assembly of FIG. 1.
Figure 4:
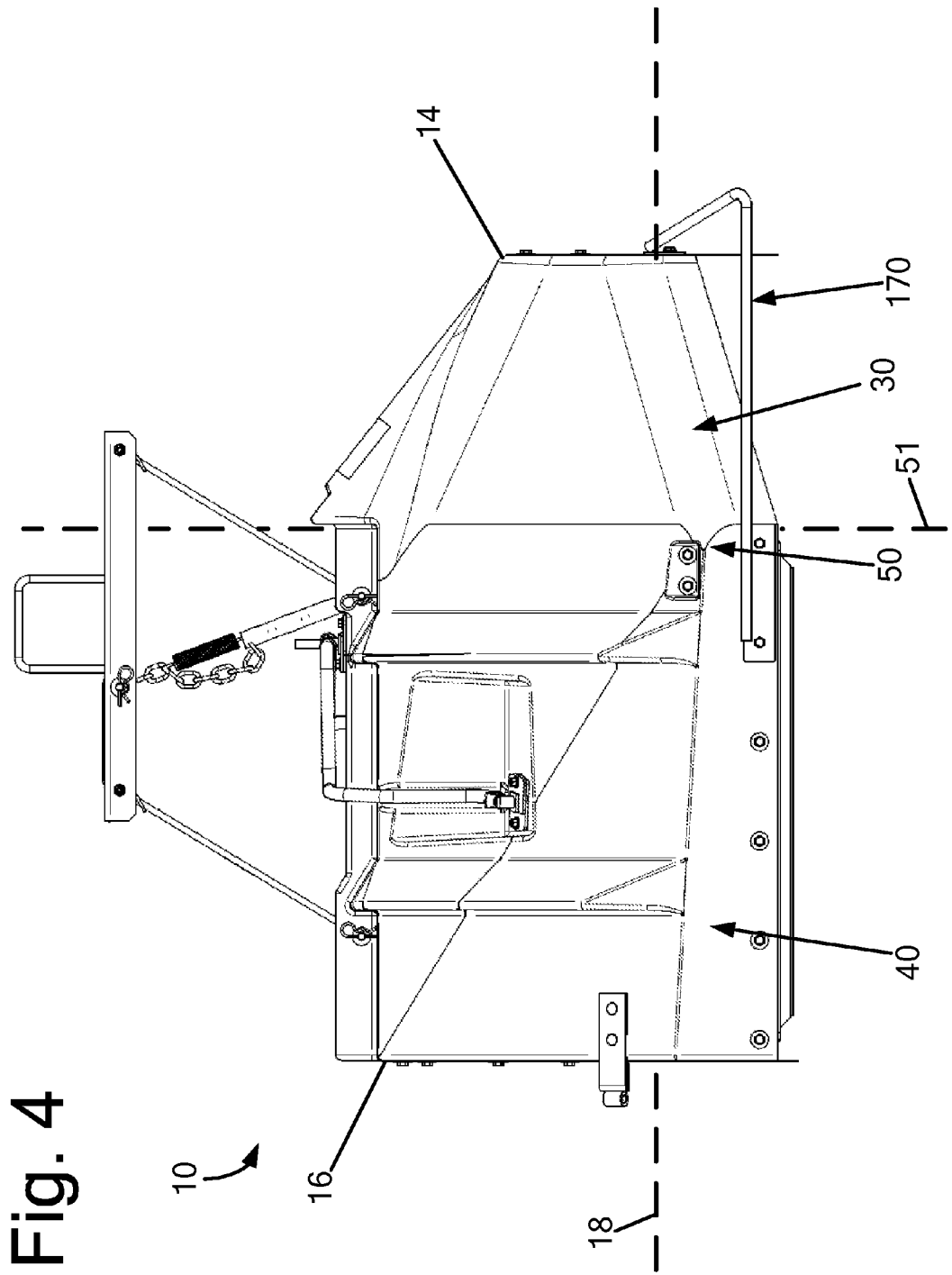
FIG. 4 is a left side view of the spray hood assembly of FIG. 1.
Figure 5:
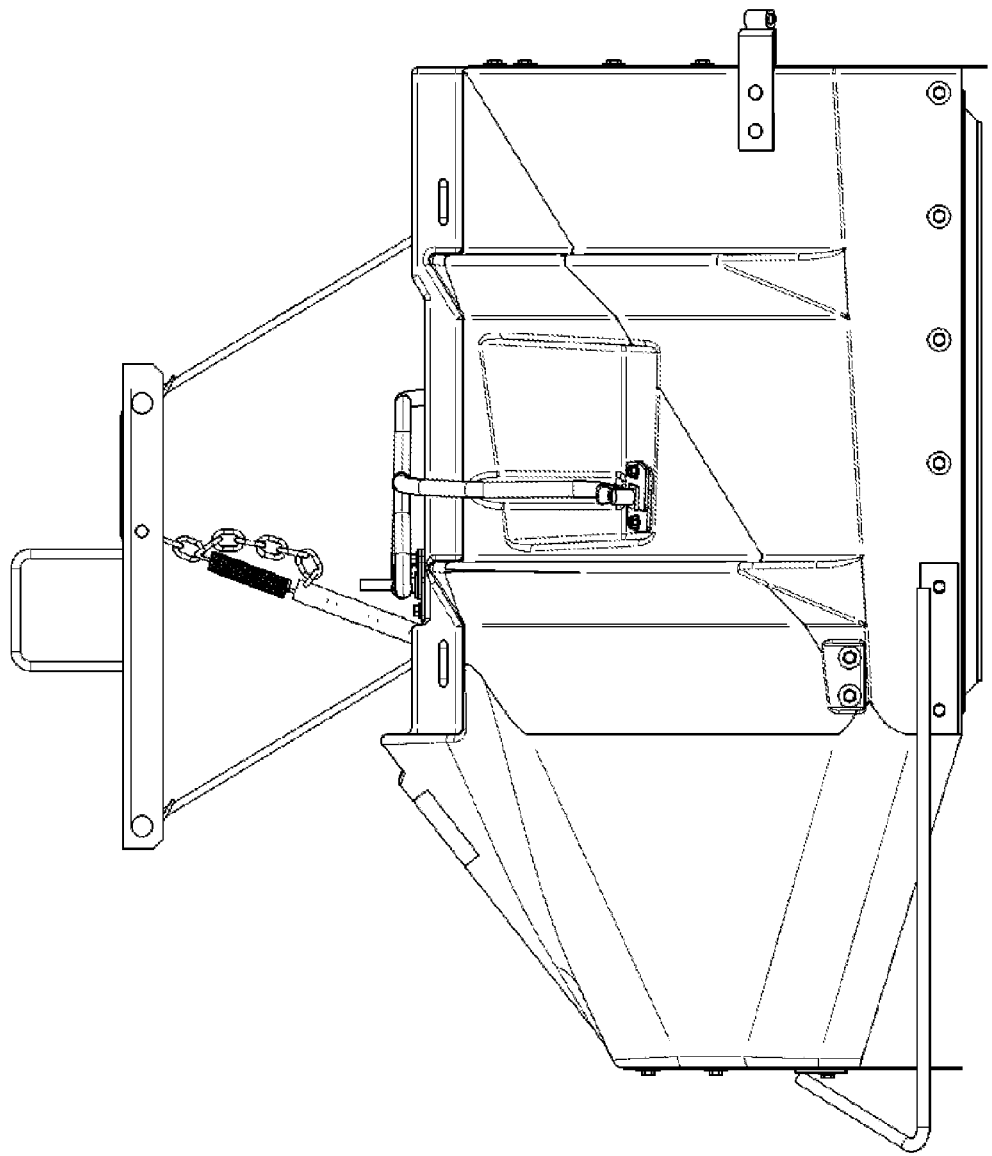
FIG. 5 is a right side view of the spray hood assembly of FIG. 1.
Figure 6:
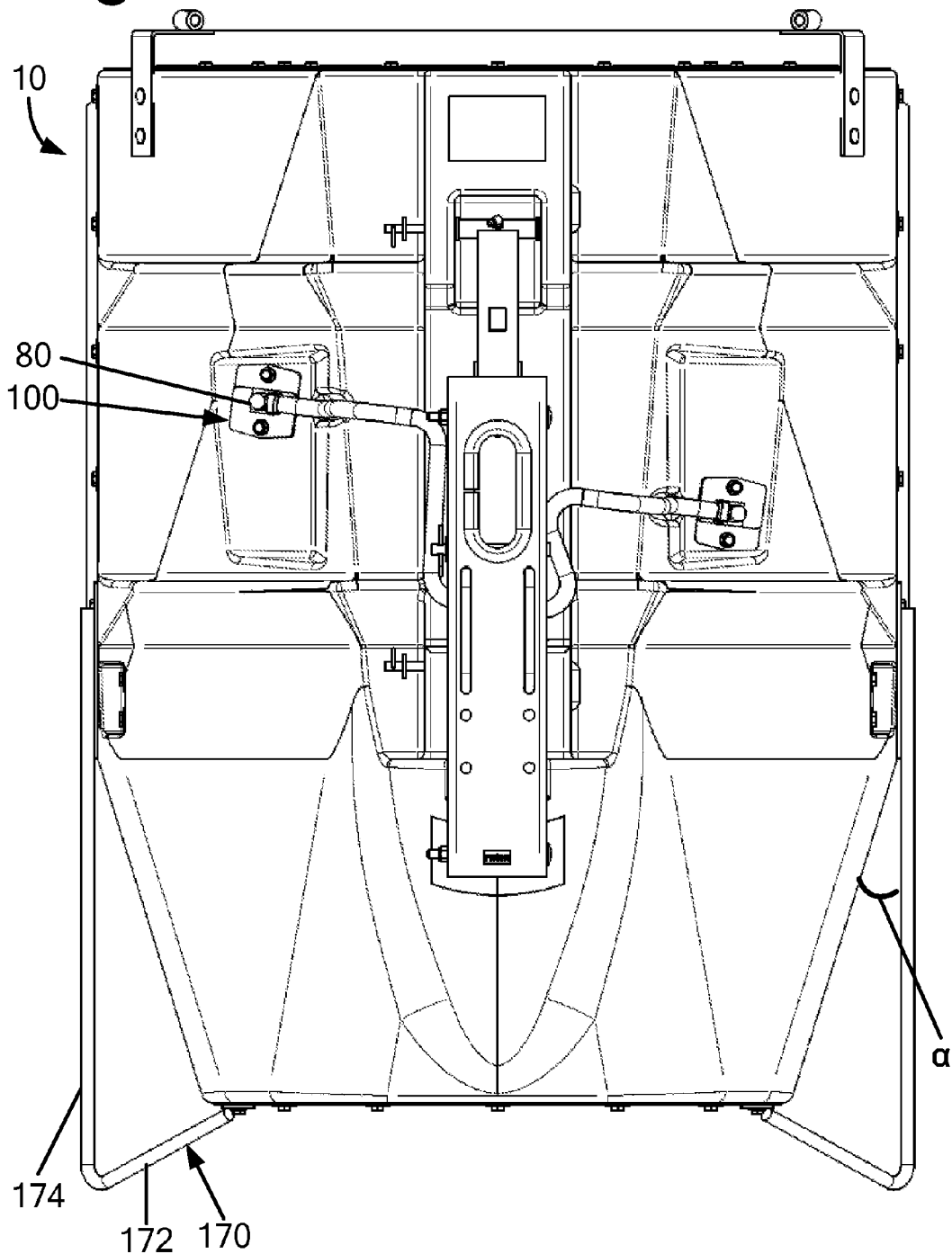
FIG. 6 is a top view of the spray hood assembly of FIG. 1.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and systems shall be described with reference to FIGS. 1-11 & 12C. It will be apparent to one skilled in the art that elements from one embodiment may be used in combination with elements of the other embodiments, and that the possible embodiments of such apparatus and systems using combinations of features set forth herein is not limited to the specific embodiments shown in the Figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Multiple views of an exemplary spray hood assembly 10 are depicted in FIGS. 1-11 & 12C. Generally, the exemplary spray hood assembly 10 is operable to traverse a ground surface and to spray liquid, such as herbicide, using spray nozzles onto undesired foliage (e.g., weeds) between rows of desired foliage (e.g., crops such as cotton) located on the ground surface. To traverse the ground surface, the spray hood assembly 10, or multiple spray hood assemblies 10, may be attached to a frame mounted on a tractor.

Figure 13:
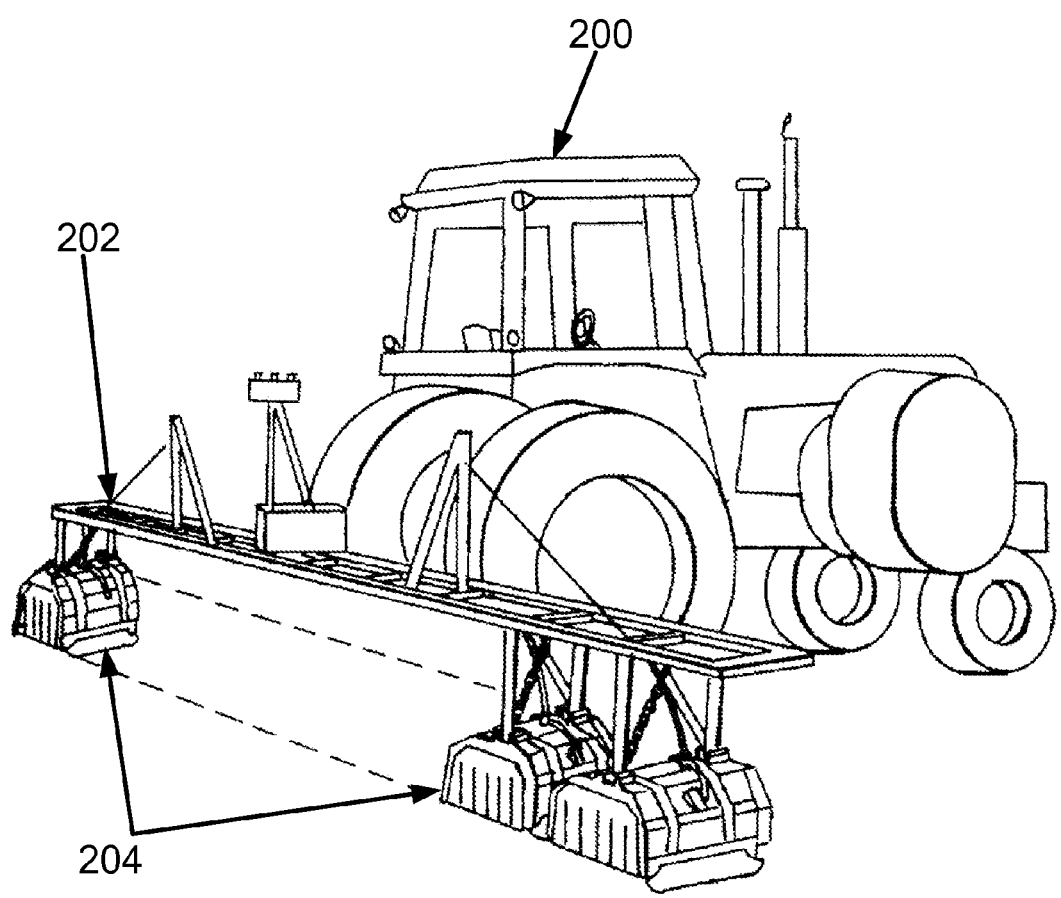
FIG. 13 is a perspective view of a plurality of spray hood assemblies attached to a frame mounted to a tractor.

For example, a tractor 200 towing a frame 202 attached to a plurality of spray hood assemblies 204 is shown in FIG. 13. The spray hood assemblies 204 are positioned along the frame 202 in parallel positions such that the spray hood assemblies 204 may be moved by the tractor 200 between rows of desired foliage (e.g., crops such as cotton, plants, etc.) being raised in field to temporarily enclose weeds between the rows of desired foliage while liquids such as herbicides are sprayed onto the weeds through the spray hood assemblies 204 by a pumping system carried by the tractor 200.

The exemplary spray hood assembly 10 includes a spray hood 12. The spray hood 12 extends from a front end 14 to a rear end 16 along an axis 18. Further, the spray hood 12 may further define an outer surface 20 and an inner surface 22 (see FIG. 7) opposite the outer surface 20. The spray hood 12 may have a generally U-shaped cross section (i.e., a cross section taken perpendicular to the axis 18) and may be made of uniformly thick, resiliently flexible polymeric material (e.g., made of about 0.21 inch thick polypropylene). The spray hood 12 may be made, or formed, by spin or rotary molding to form two of the spray hoods 10 together as a generally cylindrical part, and by then cutting the spray hoods 12 from each other, but could also be made by injection molding.

The inner surface 22 defines a channel 24 within which the undesired foliage (e.g., weeds) may be temporarily located as the spray hood assembly 10 is moved over a ground surface. The channel 24 defines at least a portion of a chamber that encloses the undesired foliage such that any liquid sprayed within the channel 24 only contacts the undesired foliage and not the desired foliage located outside of the channel 24. The channel 24 extends from the front end 14 to the rear end 16. The channel 24 may define an open front end 15 located at the front end 14 of the spray hood 12 and an open rear end 17 located at the rear end 16 of the spray hood 12. As described previously, the spray hood defines an axis 18. The channel 24 of the spray hood 12 may be described as extending along the axis 18.

The spray hood 12 includes a tapered front portion 30 and a rear portion 40. The tapered front portion 30 extends from the front end 14 to a transition region 50. As shown in FIG. 12C, the tapered front portion 30 defines a tapered front portion length 32 that is parallel to the axis 18. The rear portion 40 extends from the rear end 16 to the transition region 50 and, as also shown in FIG. 12C defines a rear portion length 42 that is parallel to the axis 18.

The tapered front portion 30 may be described as the portion of the spray hood 12 where the spray hood 12 converges from the transition region 50 to the front end 14 such that the channel 24 proximate the front end 14 is smaller than the channel proximate the transition region 50. Conversely, the tapered front portion 30 may be described as including divergent surfaces extending from the front end 14 toward the transition region 50 (e.g., at an angle α greater than or equal to about 10 degrees, about 15 degrees, about 20 degrees, about 25 degrees, about 30 degrees, 35 degrees, and/or less than or equal to about 25 degrees, about 30 degrees, 35 degrees, about 40 degrees, about 45 degrees with respect to the axis 18) so that its outer surface 20 may assist in lifting and directing portions of desired foliage along adjacent rows away from the channel 24 of the spray hood 12.

The exemplary spray hood 12 is a substantial improvement over prior art spray hoods. Right side views of prior art spray hoods 300, 400 are depicted in FIGS. 12A-B, respectively, and a right side view of the exemplary spray hood 12 is depicted in FIG. 12C. The drawings shown in FIGS. 12A-C are shown to scale. Two measurements are shown for each of the spray hoods 300, 400, 12 depicted in FIGS. 12A-C: a tapered front portion length 302, 402, 32, respectively, extending from the front ends of the spray hoods 300, 400, 12 to a transition region and a rear portion length 304, 404, 42, respectively, extending from the rear ends of the spray hoods 300, 400, 12 to the transition region. The transition region is the region of the spray hood where the shape of the spray hood changes either to or from a taper. More specifically, a transition plane may extend through the transition region perpendicular to an axis that extends through the channel of each spray hood. The transition plane 306, 406, 51 may be used for the end points within the transition region for the tapered front portion lengths 302, 402, 32 and for the rear portion lengths 304, 404, 42.

The tapered front portion length 302 of the prior art spray hood 300 is about 5.5 inches and the rear portion length 304 of the prior art spray hood 300 is about 22.25 inches. In other words, the tapered front portion length 302 is about 25% of the rear portion length 304 in the prior art spray hood 300.

The tapered front portion length 402 of the prior art spray hood 400 is about 17.75 inches and the rear portion length 404 of the prior art spray hood 400 is about 22 inches. In other words, the tapered front portion length 402 is about 80% of the rear portion length 404 in the prior art spray hood 400. Further, this spray hood 400 does not include an opening located proximate the front end.

The tapered front portion length 32 of the exemplary spray hood 12 is about 12.75 inches and the rear portion length 42 of the exemplary spray hood 12 is about 26.25 inches. In other words, the tapered front portion length 32 is about 50% of the rear portion length 42 in the exemplary spray hood 12. Such dimensions provided by the exemplary spray hood 12 provide improvements and advantages over the prior art spray hood 300, 400. For example, the prior art spray hood 300 has been often used to spray between rows of young cotton but has been found to not be as effective between rows of more mature cotton (e.g., due to entanglement with the more mature cotton, etc.). To spray the more mature cotton, the prior art spray hood 400 has often been used. The dimensions of the exemplary spray hood 12 allow to be used with young and more mature cotton with greater success than the prior art spray hoods 300, 400.

Although as depicted the tapered front portion length 32 is about 50% of the rear portion length 42, the tapered front portion length 32 may be greater than or equal to about 30%, about 35%, about 40%, about 45%, about 50%, and about 60% of the rear portion length 42 in the exemplary spray hood 12. Further, the tapered front portion length 32 may be less than or equal to about 80%, about 70%, about 60%, about 55%, about 50%, and about 45% of the rear portion length 42 in the exemplary spray hood 12.

The spray hood 12 may further include axially spaced circumferentially extending rib-like reinforcing portions 13 spaced along its length. The rib-like reinforcing portions 13 may have V-shaped cross sections, with their leading outer surfaces being inclined at an angle so that they may assist in the lifting and directing of portions of desired foliage along adjacent rows away from liquid distribution and spraying apparatus described herein.

A top portion 21 of the spray hood 12 may be adapted, e.g., by having two recessed areas between side bosses, to have lifting apparatus 60 attached thereto for suspending and raising/lowering the spray hood assembly 10 from a support frame.

Figure 7:
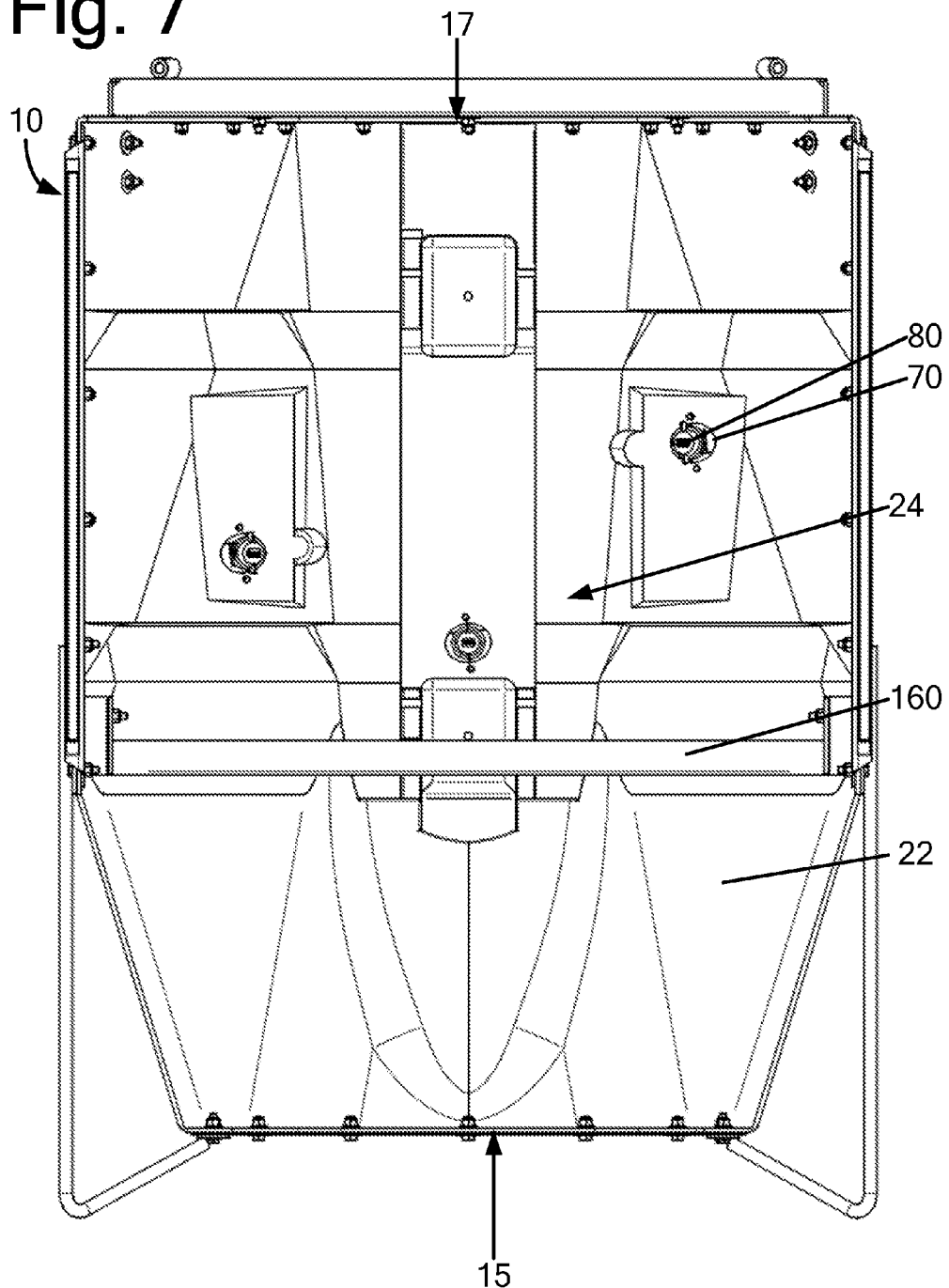
FIG. 7 is a bottom view of the spray hood assembly of FIG. 1.
Figure 8:
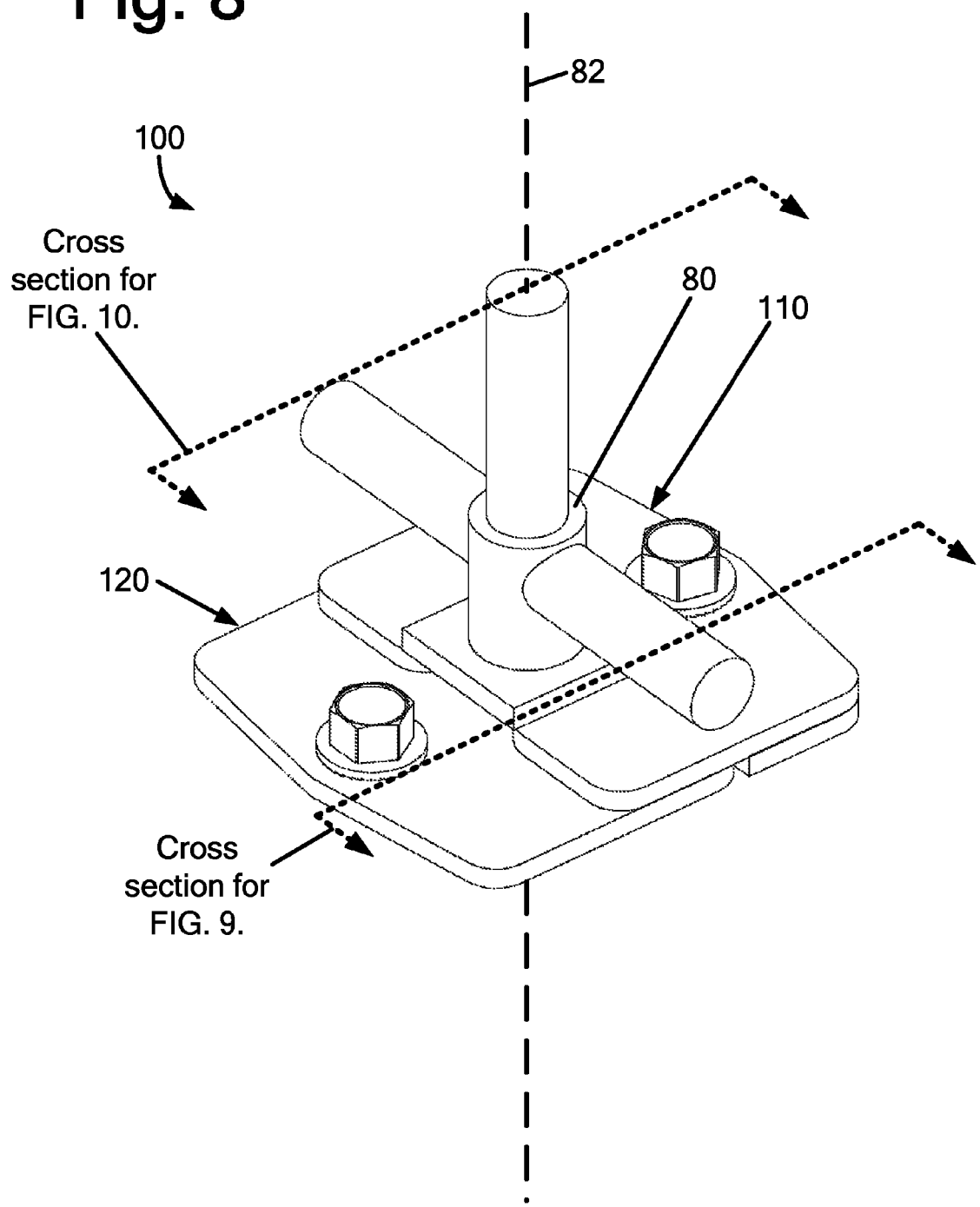
FIG. 8 is a perspective view of an exemplary spray nozzle assembly of the spray hood assembly of FIG. 1.

As shown in FIG. 7, the spray hood 12 may further define one or more spray nozzle apertures 70 (e.g., at least one spray nozzle aperture, a plurality of spray nozzle apertures, etc.). Each spray nozzle aperture 70 may be configured to receive a spray nozzle 80. The spray nozzle apertures 70 may be located about the spray hood 12 so as to allow spray nozzles 80 located therein to spray liquid within the channel 24 so as to contact any undesired foliage located in the channel 24. In at least one embodiment, wherein the nozzle apertures 70 define an opening larger than the upper and lower flanges of the spray nozzles 80, e.g., such that the nozzles 80 are not in direct contact with the spray hood 12.

The exemplary spray hood assembly 10 may include a liquid distribution apparatus 90. The liquid distribution apparatus 90 may include anything that may be used to distribute sprayable liquid to the spray nozzles 80. As shown, the liquid distribution apparatus 90 includes three hoses 92 extending to spray nozzles 80.

The spray nozzle 80 (e.g., as shown in FIGS. 8-12) may extend along an axis 82 and may include an upper flange 84 and a lower flange 86. Each of the upper flange 84 and the lower flange 86 may extend perpendicularly from the axis 82 around the spray nozzle 80. An exemplary spray nozzle 80 may be a nozzle of the type provided under the trademark "TeeJet" by Spraying Systems Co., Wheaton, Ill. The spray nozzles 80 may direct spray at desired orientations and locations within the channel 24 of the spray hood 12. The spray pattern from each nozzle 80 can further be adapted as desired to the type of plant or location on the plant at which the spray is to be directed by selecting nozzles that provide different spray angles or spray patterns such as a circular or fan like pattern, nozzles with such types of patterns being well known in the art and available from Spraying Systems Co., Wheaton, Ill.

The spray nozzles 80 may be located within the spray nozzle openings 70 and may be coupled to the spray hood 12 through the use of a spray nozzle assembly 100. The spray nozzle assembly 100 may include a first retention plate 110 and a second retention plate 120.

Figure 9:
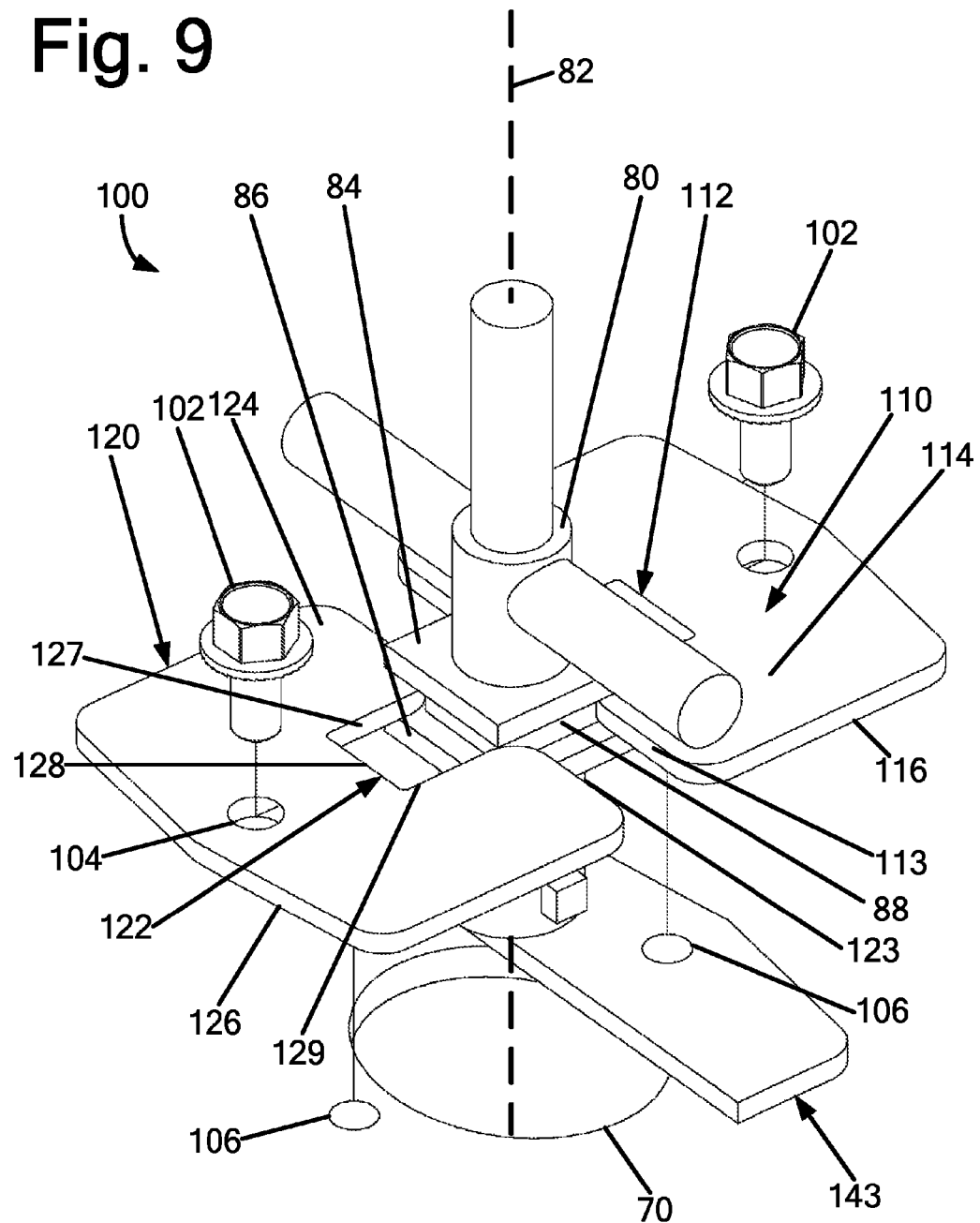
FIG. 9 is an exploded perspective view of the spray nozzle assembly of FIG. 8.
Figure 10:
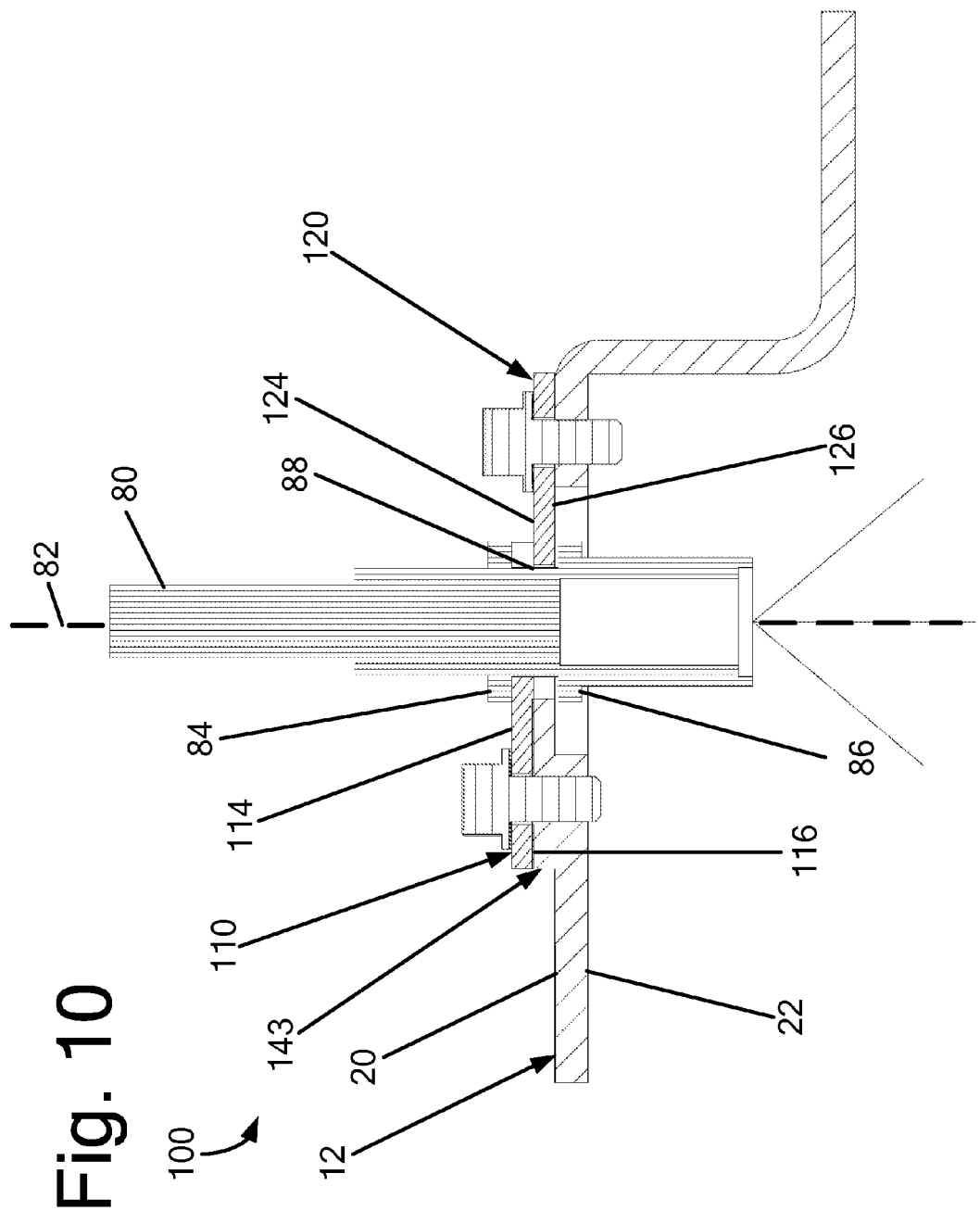
FIG. 10 is a cross-sectional view of the spray nozzle assembly of FIG. 8.

Each of the retention plates 110, 120 may be coupled to the spray hood and may define a receiving opening 112, 122, respectively, as shown in FIG. 9. The receiving openings 112, 122 are configured to receive the spray nozzle 80 therein. Further, each of the retention plates 110, 120 further defines a top side 114, 124, respectively, and a bottom side, 116, 126, respectively (e.g., the bottom sides opposite from the top sides).

A spray nozzle 80 may be retained within the receiving openings 112, 122 of each of the retention plates 110, 120 such that the top side 114 of the first retention plate 110 is adjacent (e.g., in contact with) the upper flange 84 of the spray nozzle 80 and the bottom side 116 of the first retention plate 110 is adjacent (e.g., in contact with) the top side 124 of the second retention plate 120, and further such that the bottom side 126 of the second retention plate 120 is adjacent (e.g., in contact with) the lower flange 86 of the spray nozzle 80. In effect, it may be described that the flanges 84, 86 of the spray nozzle 80 "sandwich" both of the retention plates 110, 120.

Further, an intermediate portion 88 of the spray nozzle 80, which is the portion of the spray nozzle between the upper flange 84 and the lower flange 86, is located in each of the receiving openings 112, 122 of the retention plates 110, 120, respectively. As shown, the retention plates 110, 120 are positioned about the spray nozzle 80 such that the receiving openings 112, 122 are located opposite one another. In effect, it may again be described that the retention plates 110, 120 are "sandwiching" the spray nozzle 80 between each other and within each of the receiving openings 112, 122.

Although the receiving openings 112, 122 may be defined by any shape operable to retain a spray nozzle, as shown, the receiving openings 112, 122 define a slot extending from an edge surface 113, 123 into an interior portion of the retention plates 110, 120, respectively. More specifically, the receiving openings 112, 122 are defined by a first retaining surface 127, a second retaining surface 128, and a third retaining surface 129 (only labeled with respect to the second retention plate 120 in FIG. 9). The first, second, and third retaining surfaces 127, 128, 129 may be configured to receive three of four sides of a square portion (e.g., intermediate portion 88) of the spray nozzle 80. Locating a square portion of the spray nozzle 80 within such retaining surfaces may assist in the restriction of rotational movement of the spray nozzle 80 about the axis 82, which may, e.g., result in less adjustment to the spray nozzles 80 and better spray coverage inside the channel 24.

Although the retention plates 110, 120 may be coupled to the spray hood 12 using various techniques, as depicted, the retention plates 110, 120 are connected to the spray hood 12 using fasteners 102. For example, the retention plates 110, 120 may define apertures 104 and the spray hood 12 may define apertures 106 for receiving the fasteners 102. Further, the spray hood 12 may further include threaded nuts molded into the spray hood 12 (although not shown) corresponding to apertures 104 and configured to receive a threaded fastener 102 (e.g., the thread fasteners 102 may include a serrated flange).

Figure 11:
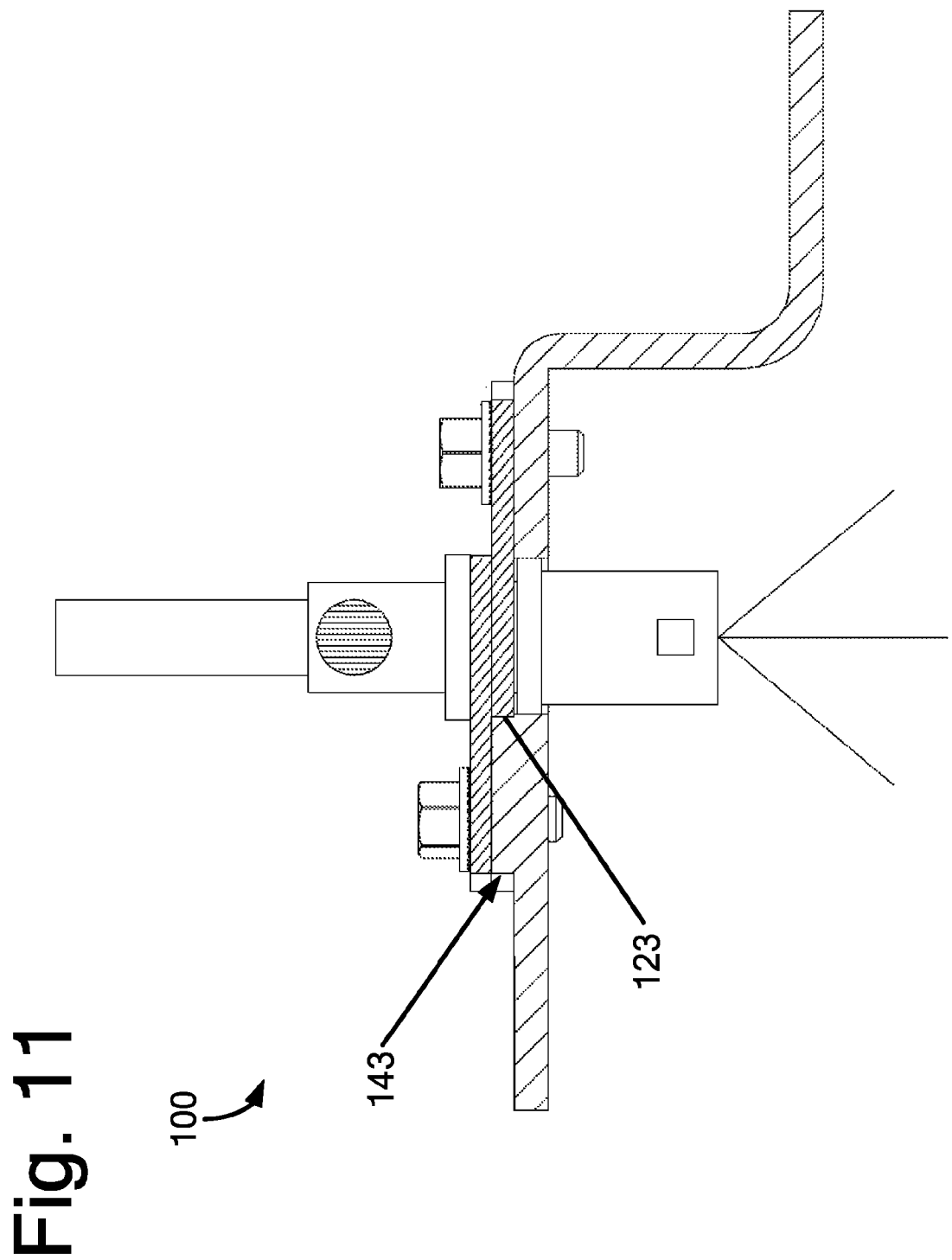
FIG. 11 is another cross-sectional view of the spray nozzle assembly of FIG. 8.

As shown, the spray hood 12 includes a raised area 143 proximate the spray nozzle aperture 70. The raised area 143 may be configured to be adjacent (e.g., to be in contact with) the bottom side 116 of the first retention plate 110 when the first retention plate is coupled to the spray hood 12. Further, a portion of the edge 123 proximate the receiving opening 122 of the second retention plate 120 may be configured to be located adjacent, or in contact with, a side surface of the raised area 143 of the spray hood 12 (e.g., as shown in FIG. 11).

The spray hood assembly 10 may further include a pair of closure sheets 150, 152 coupled to the spray hood 12 at opposite ends of the channel 24 that are configured to retain liquid when sprayed by the spray nozzles 80 within the channel 24. The front closure sheet 150 may be coupled to the spray hood 12 proximate the open end 15 of the channel 24 and may be further configured to allow the passage of undesired foliage into the channel 24 when the spray hood assembly 10 is being used (e.g., moved over a ground surface upon which undesired foliage is growing). Further, the rear closure sheet 152 may be coupled to the spray hood 12 proximate the open end 17 of the channel 24 and may be further configured to allow the passage of undesired foliage out of the channel 24 when the spray hood assembly 10 is being used (e.g., moved over a ground surface upon which undesired foliage is growing). For example, while the spray hood assembly 12 is being moved over undesired foliage, the undesired foliage may pass through the closure sheet 150 into the channel 24, be sprayed by the spray nozzles 80 while the undesired foliage is in the channel 24, and may exit the channel 24 through the closure sheet 152.

The closures sheets 150, 152 may be formed of stiff polymeric material (e.g., 0.6 inch thick polyethylene). Further, the closure sheets 150, 152 may each include continuous or unslotted upper portions proximate their attachment or coupling to the spray hood 12 and may each include longitudinal side by side flap portions (e.g., each about 3 inches wide) extending from the upper portion toward the ground surface defining parallel slots or slits.

The spray hood assembly 10 may further include one or more elongate knock-down bars 160 extending between opposite side wall portions of the spray hood 12 (as shown in FIG. 7) (e.g., perpendicular to the axis 18) and proximate the front end 14 of the spray hood 12 and front open end 15 of the channel 24. The knock-down bars 160 may be configure to deflect undesired foliage located within the channel 24 downwardly towards the ground surface to, e.g., allow more of the undesired foliage to be sprayed with liquid when in the channel 24.

The spray hood assembly 10 may further include a pair of gathering rods 170 that are configured to direct undesired foliage into the channel 24. The gathering rods 170 may extend from the spray hood 12 proximate the transition region 50 to the front end 14. More specifically, the gathering rods may define a proximal portion 172 and a distal portion 174. The proximal portion 172 may be coupled to the spray hood 12 proximate the transition region 50 and may extend beyond the front end 14 parallel to the axis 18. The distal portion 174 may be coupled to the spray hood 12 proximate the front end 14 and may be coupled to the proximal portion 172.

Suspension apparatus 60 may also be included as part of the spray hood assembly 10. The suspension apparatus 60 may be configured to suspend, or support, the spray hood 12 from a frame to be used in conjunction with a tractor (as shown in FIG. 13). The suspension apparatus 60 may include two rigid bars pivotally coupled to the spray hood 12 proximate the top portion 21 of the spray hood 12. The two rigid bars may also be pivotally coupled to a frame member, which may be part of a frame or may be coupled to a frame. Such pivotal couplings may allow the spray hood 12 to be raised and lowered with respect to the ground surface. The suspension apparatus 60 may further include actuation apparatus (e.g., a hydraulic piston, etc.) to raise and lower the spray hood 12.

As an example, the spray hood 12 may be adapted for use between crop rows separated by about 36 to 40 inches (e.g., cotton) and may a have a length (parallel the axis 18) of about 39 inches and a channel width (perpendicular the axis 18) between the outer surfaces within the rear portion 40 of about 30 inches (e.g., in a range of about 15 inches to about 40 inches depending on use). Further, the spray hood 10 may define a channel width (perpendicular the axis 18) between the outer surfaces proximate the front end 14 of about 18 inches. Still further, the spray hood 10 may define a channel height (perpendicular the axis 18) between a lowermost portion of the spray hood 10 and the uppermost portion of the channel 24. For example, the front open end 15 of the spray hood 10 may have a channel height of about 11.5 inches (e.g., in a range of about 6 inches to about 30 inches depending on use).

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A spray hood assembly operable to spray liquid onto undesired foliage between rows of desired foliage using at least one spray nozzle, wherein the at least one spray nozzle extends along an axis and including an upper flange and a lower flange, each flange extending perpendicularly from the axis around the at least one spray nozzle, the spray hood assembly comprising:
   a spray hood extending from a front end to a rear end and defining an outer surface and an inner surface, wherein the inner surface defines a channel from the front end to the rear end, wherein spray hood defines at least one spray nozzle aperture extending through the outer surface and the inner surface into the channel and configured to receive the at least one spray nozzle, and
   at least one spray nozzle assembly to retain the at least one spray nozzle within the at least one spray nozzle aperture of the spray hood, wherein the at least one spray nozzle assembly comprises:
      a first retention plate coupled to the spray hood and defining a receiving opening configured to receive a spray nozzle therein, wherein the first retention plate further defines a top side and a bottom side,
      a second retention plate coupled to the spray hood and defining a receiving opening configured to receive a spray nozzle therein, wherein the second retention plate further defines a top side and a bottom side,
      wherein the at least one spray nozzle is retained within the receiving opening of each of the first retention plate and the second retention plate by the upper flange of the at least one spray nozzle being adjacent to the top side of the first retention plate, the lower flange of the at least one spray nozzle being adjacent to the bottom side of the second retention plate, and the bottom side of the first retention plate being adjacent the top side of the second retention plate.

2. The spray hood assembly of claim 1, wherein the spray hood defines a first fastener aperture and a second fastener aperture, wherein each of the first and the second fastener aperture are located proximate the at least one spray nozzle aperture, and wherein the at least one spray nozzle assembly comprises:
   a first fastener configured to couple the first retention plate to the spray hood using the first fastener aperture, and
   a second fastener configured to couple the second retention plate to the spray hood using the second fastener aperture.

3. The spray hood assembly of claim 2, wherein the spray hood further comprises threaded nut molded into the spray hood for each of the first and the second fastener apertures and configured to receive a threaded fastener.

4. The spray hood assembly of claim 1, wherein the spray hood further comprises a raised area proximate the at least one spray nozzle aperture configured to contact the bottom side of the first retention plate.

5. The spray hood assembly of claim 4, wherein the second retention plate defines an edge perpendicular to each of the top and the bottom sides and proximate the opening, wherein the edge of the second retention plate contacts a side surface of the raised area of the spray hood.

6. The spray hood assembly of claim 1, wherein the receiving opening of each of the first and the second retention plates defines a slot extending from an edge surface into an interior portion.

7. The spray hood assembly of claim 1, wherein the receiving opening of each of the first and the second retention plates defines a first retaining surface, a second retaining surface, and a third retaining surface, wherein the first, second, and third retaining surfaces are configured to receive three of four sides of a square portion of the at least one spray nozzle located between the first flange and the second flange to restrict rotational movement of the at least one spray nozzle about the axis.

8. The spray hood assembly of claim 1, wherein the receiving opening of the first retention plate and the receiving opening of the second retention plate are located opposite one another when the at least one spray nozzle is retained within the receiving opening of each of the first retention plate and the second retention plate.

9. The spray hood assembly of claim 1, wherein the at least one spray nozzle aperture defines an opening larger than each of the upper and lower flanges of the at least one spray nozzle.

10. A spray nozzle assembly to retain a spray nozzle within a spray nozzle aperture of a spray hood, wherein the spray nozzle extends along an axis and including an upper flange and a lower flange, wherein the at least one spray nozzle assembly comprises:
   a first retention plate couplable to the spray hood and defining a receiving opening configured to receive the spray nozzle therein, wherein the first retention plate further defines a top side and a bottom side;
   a second retention plate couplable to the spray hood and defining a receiving opening configured to receive the spray nozzle therein, wherein the second retention plate further defines a top side and a bottom side,
   wherein the spray nozzle is receivable within the receiving opening of each of the first retention plate and the second retention plate such that the top side of the first retention plate is adjacent the upper flange of the at least one spray nozzle, the bottom side of the first retention plate is adjacent the top side of the second retention plate, and the bottom side of the second retention plate is adjacent the lower flange of the at least one spray nozzle to retain the at least one spray nozzle within the receiving opening of each of the first retention plate and the second retention plate.

11. A spray hood assembly operable to traverse a ground surface and to spray liquid using spray nozzles onto undesired foliage between rows of desired foliage located on the ground surface, the spray hood assembly comprising:
a spray hood extending from a front end to a rear end along an axis and defining an outer surface and an inner surface, wherein the inner surface defines a channel extending from the front end to the rear end, wherein the channel defines an open end located at the front end of the spray hood, wherein the spray hood comprises:
a tapered front portion extending from the front end to a transition region and defining a tapered front portion length parallel to the axis, and
a rear portion extending from the rear end to the transition region and defining a rear portion length parallel to the axis,
wherein the tapered front portion length is greater than 30% of the rear portion length; and
a closure sheet coupled to the spray hood proximate the open end of the channel, wherein the closure sheet is configured to retain liquid when sprayed by spray nozzles within the channel and to allow the passage of undesired foliage into the channel of the spray hood when operating.

12. The spray hood assembly of claim 11, wherein the tapered front portion length is greater than 40% of the rear portion length.

13. The spray hood assembly of claim 11, wherein the transition region is a transition plane perpendicular to the axis.

14. The spray hood assembly of claim 11, wherein the spray hood converges from the transition region to the front end such that the channel proximate the front end is smaller than the channel proximate the transition region.

15. The spray hood assembly of claim 11, wherein the spray hood assembly further comprises at least one gathering rod extending from the spray hood proximate the transition region to the front end, wherein the at least one gathering rod is configured to direct undesired foliage into the channel.

16. The spray hood assembly of claim 14, wherein the at least one gathering rod defines a proximal portion and a distal portion, wherein the proximal portion is coupled to the spray hood proximate the transition region and extends beyond the front end parallel to the axis, and wherein the distal portion is coupled to the spray hood proximate the front end and is coupled to the proximal portion.

17. The spray hood assembly of claim 11, wherein the spray hood assembly further comprises at least one knock-down bar located within the channel extending perpendicular to the axis, wherein the at least one knock-down bar is configured to deflect undesired foliage located within the channel downwardly towards the ground surface.

18. The spray hood assembly of claim 11, wherein the channel defines a rear open end located at the rear end of the spray hood, and wherein the spray hood assembly further comprises a rear closure sheet coupled to the spray hood proximate the rear open end of the channel, wherein the rear closure sheet is configured to retain liquid sprayed by spray nozzles within the channel and to allow the passage of undesired foliage out of the channel of the spray hood.

19. The spray hood assembly of claim 1, wherein, to retain the at least one spray nozzle, the top side of the first retention plate is in contact with the upper flange of the at least one spray nozzle, the bottom side of the first retention plate is in contact with the top side of the second retention plate, and the bottom side of the second retention plate is in contact with the lower flange of the at least one spray nozzle.

20. The spray hood assembly of claim 1, wherein, to retain the at least one spray nozzle, the first retention plate and the second retention plate sandwich the at least one spray nozzle between the receiving opening of the first retention plate and the receiving opening of the second retention plate.

21. The spray hood assembly of claim 1, wherein the first retention plate is positioned proximate the outer surface of the spray hood and outside of the channel of the spray hood.

22. A spray hood assembly operable to spray liquid onto undesired foliage between rows of desired foliage using at least one spray nozzle, wherein the at least one spray nozzle extends along an axis and including an upper flange and a lower flange, each flange extending perpendicularly from the axis around the at least one spray nozzle, the spray hood assembly comprising:
a spray hood extending from a front end to a rear end and defining an outer surface and an inner surface, wherein the inner surface defines a channel from the front end to the rear end, wherein spray hood defines at least one spray nozzle aperture configured to receive the at least one spray nozzle, and
at least one spray nozzle assembly to retain the at least one spray nozzle within the at least one spray nozzle aperture of the spray hood, wherein the at least one spray nozzle assembly comprises:
a first retention plate coupled to the spray hood and defining a receiving opening configured to receive a spray nozzle therein, wherein the first retention plate further defines a top side and a bottom side, and
a second retention plate coupled to the spray hood and defining a receiving opening configured to receive a spray nozzle therein, wherein the second retention plate further defines a top side and a bottom side,
wherein the at least one spray nozzle is retained within the receiving opening of each of the first retention plate and the second retention plate such that the top side of the first retention plate is adjacent the upper flange of the at least one spray nozzle and the bottom side of the first retention plate is adjacent the top side of the second retention plate and such that the bottom side of the second retention plate is adjacent the lower flange of the at least one spray nozzle,
wherein the receiving opening of the first retention plate and the receiving opening of the second retention plate are located opposite one another when the at least one spray nozzle is retained within the receiving opening of each of the first retention plate and the second retention plate.

* * * * *